United States Patent
Lee et al.

(10) Patent No.: US 9,552,644 B2
(45) Date of Patent: Jan. 24, 2017

(54) MOTION ANALYSIS METHOD AND APPARATUS

(71) Applicant: SAMSUNG ELECTRONICS CO., LTD., Suwon-si (KR)

(72) Inventors: Kyoobin Lee, Seoul (KR); Eric Hyunsurk Ryu, Hwaseong-si (KR); Jun Haeng Lee, Hwaseong-si (KR); Sang-Gyun Chon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 78 days.

(21) Appl. No.: 14/699,546

(22) Filed: Apr. 29, 2015

(65) Prior Publication Data
US 2016/0140731 A1    May 19, 2016

(30) Foreign Application Priority Data

Nov. 17, 2014 (KR) .......................... 10-2014-0159853

(51) Int. Cl.
*G06F 9/00* (2006.01)
*G06T 7/00* (2006.01)

(52) U.S. Cl.
CPC ................................... *G06T 7/0075* (2013.01)

(58) Field of Classification Search
CPC .................... G06T 7/0075; G06T 2207/10028; G06K 9/00355; G06K 9/00375
See application file for complete search history.

(56) References Cited

U.S. PATENT DOCUMENTS

| 8,395,615 | B2 | 3/2013 | Kim et al. |
| 8,624,932 | B2 | 1/2014 | Hildreth et al. |
| 2006/0197664 | A1* | 9/2006 | Zhang ................... G06T 7/2033 340/555 |
| 2007/0110298 | A1* | 5/2007 | Graepel ............. G06K 9/00355 382/154 |
| 2011/0211754 | A1* | 9/2011 | Litvak ................ G06K 9/00375 382/165 |
| 2011/0304695 | A1 | 12/2011 | Lim et al. |
| 2012/0062558 | A1 | 3/2012 | Lee et al. |
| 2012/0169848 | A1 | 7/2012 | Bae et al. |
| 2012/0262448 | A1 | 10/2012 | Kim et al. |
| 2013/0027521 | A1 | 1/2013 | DeLuca |
| 2013/0050061 | A1 | 2/2013 | Ueno et al. |
| 2013/0050202 | A1 | 2/2013 | Ueno et al. |

(Continued)

FOREIGN PATENT DOCUMENTS

| JP | 2007-049598 A | 2/2007 |
| JP | 2007-243647 A | 9/2007 |

(Continued)

*Primary Examiner* — Phuoc Tran
(74) *Attorney, Agent, or Firm* — Sughrue Mion, PLLC

(57) ABSTRACT

A method and apparatus for analyzing a motion based on depth information are provided. The method includes: receiving event signals from a first vision sensor configured to generate at least one event signal by sensing at least a portion of an object in which a motion occurs; receiving a current frame from a second vision sensor configured to time-synchronously capture the object; synchronizing the received event signals and the received current frame; and obtaining depth information of the object based on the synchronized event signals and current frame.

20 Claims, 15 Drawing Sheets

(56) References Cited

U.S. PATENT DOCUMENTS

| | | | |
|---|---|---|---|
| 2013/0194392 A1 | 8/2013 | Qi et al. | |
| 2013/0201102 A1 | 8/2013 | Klinghult | |
| 2014/0111423 A1 | 4/2014 | Park et al. | |
| 2014/0125994 A1 | 5/2014 | Kim et al. | |
| 2015/0339826 A1* | 11/2015 | Buibas .................. | B64D 47/08 |
| | | | 382/106 |

FOREIGN PATENT DOCUMENTS

| | | |
|---|---|---|
| JP | 2013-113877 A | 6/2013 |
| JP | 5224319 B2 | 7/2013 |
| KR | 10-2009-0081190 A | 7/2009 |
| KR | 10-2012-0067846 A | 6/2012 |
| KR | 10-1226668 B1 | 1/2013 |
| KR | 10-1227878 B1 | 1/2013 |
| KR | 10-2013-0053476 A | 5/2013 |
| KR | 10-2013-0058203 A | 6/2013 |
| KR | 10-2013-0083547 A | 7/2013 |
| KR | 10-1356015 B1 | 1/2014 |

* cited by examiner

MOTION ANALYSIS METHOD AND APPARATUS

CROSS-REFERENCE TO RELATED APPLICATION

This application claims priority from Korean Patent Application No. 10-2014-0159853, filed on Nov. 17, 2014 in the Korean Intellectual Property Office, the disclosure of which is incorporated herein by reference in its entirety.

BACKGROUND

1. Field

Methods and apparatuses consistent with one or more exemplary embodiments relate to motion analysis.

2. Description of the Related Art

Based on a motion-based user interfacing scheme, a user intention may be input by recognizing a motion of a user in a space. Since the motion-based user interfacing scheme is based on image data output from a frame-based vision sensor, the user intention may be inaccurately input based on a distance between a device and an object in which a motion occurs. Also, when two frame-based vision sensors are used to recognize the motion based on depth information of the object, costs for manufacturing the device may increase and an optimal performance of the device may not be guaranteed due to a relatively low reaction velocity of the frame-based vision sensor.

SUMMARY

Aspects of one or more exemplary embodiments may address at least the above problems and/or disadvantages and other disadvantages not described above. Also, one or more exemplary embodiments are not required to overcome the disadvantages described above, and an exemplary embodiment may not overcome any of the problems described above.

According to an aspect of another exemplary embodiment, there is provided a method of analyzing a motion based on depth information, the method including: receiving event signals from a first vision sensor configured to generate at least one event signal by sensing at least a portion of an object in which a motion occurs; receiving a current frame from a second vision sensor configured to time-synchronously capture the object; synchronizing the received event signals and the received current frame; and obtaining depth information of the object based on the synchronized event signals and current frame.

The first vision sensor may include an event-based vision sensor configured to generate the at least one event signal in response to an event in which light received from the object is changed non-time-synchronously.

The synchronizing may include matching the received current frame and the received event signals, received between a timing of a previous frame and a timing of the current frame.

The synchronizing may include matching the received current frame and the received event signals, received between a timing to which a predetermined latency is delayed from a timing of a previous frame and a timing to which the predetermined latency is delayed from a timing of the current frame.

The synchronizing may include determining, based on latencies of current event signals, at least one event signal to match a previous frame from among the current event signals received between a timing of the previous frame and a timing of the current frame.

The synchronizing may include determining, based on latencies of subsequent event signals, at least one event signal to match the current frame from among the subsequent event signals received between a timing of the current frame and a timing of a subsequent frame.

The latencies may be time differences between points in time at which the current event signals are generated and points in time at which the current event signals are received.

The method may further include: obtaining an edge image by detecting an edge from the received current frame, wherein the synchronizing may include synchronizing the received event signals and the obtained edge image.

The obtaining may include obtaining the depth information of the object based on a disparity calculated based on the synchronized event signals and current frame.

The disparity may be calculated by comparing pixel information on a pixel of one axis in the synchronized current frame and an event signal positioned on the one axis among the synchronized event signals.

The method may further include: analyzing the motion of the object based on the received event signals; and compensating for the motion of the object based on the depth information of the object and the analyzed motion of the object.

The analyzing may include analyzing the motion of the object based on an optical flow including at least one velocity vector related to the received event signals.

The method may further include: compensating for the depth information of the object by using a velocity vector obtained based on the optical flow, wherein the velocity vector may correspond to the received event signals.

The receiving the current frame may include receiving the current frame from a frame-based vision sensor configured to capture the object based on a predetermined number of frames per second.

The first vision sensor and the second vision sensor may be spaced apart at a predetermined interval and disposed in a same direction.

According to an aspect of another exemplary embodiment, there is provided a non-transitory computer-readable recording medium having recorded thereon a program executable by a computer to implement the method.

According to an aspect of another exemplary embodiment, there is provided an apparatus for analyzing a motion based on depth information, the apparatus including: a first vision sensor configured to generate at least one event signal by sensing at least a portion of an object in which a motion occurs; a second vision sensor configured to generate a current frame by time-synchronously capturing the object; and a processor configured to synchronize the generated at least one event signal received from the first vision sensor and the generated current frame received from the second vision sensor, and to obtain depth information of the object based on the synchronized event signals and current frame.

The first vision sensor may include an event-based vision sensor configured to generate the at least one event signal in response to an event in which light received from the object is changed non-time-synchronously.

The processor may be configured to match the received current frame and the received at least one event signal, received between a timing of a previous frame and a timing of the current frame.

The processor may be configured to match the received current frame and the received at least one event signal, received between a timing to which a predetermined latency is delayed from a timing of a previous frame and a timing to which the predetermined latency is delayed from a timing of the current frame.

According to an aspect of another exemplary embodiment, there is provided an apparatus for analyzing a motion based on depth information, the apparatus including: a processor configured to synchronize at least one event signal received from a first vision sensor and a current frame received from a second vision sensor, and to obtain depth information of an object based on the synchronized event signals and current frame, wherein the received at least one event signal is generated according to a motion of the object, and the received current frame is generated according to a time-synchronous capture of the object.

The at least one event signal may be received from an event-based vision sensor configured to generate the at least one event signal in response to an event in which light received from the object is changed non-time-synchronously.

The processor may be configured to match the received current frame and the received at least one event signal, received between a timing of a previous frame and a timing of the current frame.

The processor may be configured to match the received current frame and the received at least one event signal, received between a timing to which a predetermined latency is delayed from a timing of a previous frame and a timing to which the predetermined latency is delayed from a timing of the current frame.

The processor may be configured to determine, based on latencies of current event signals, at least one event signal to match a previous frame from among the current event signals received between a timing of the previous frame and a timing of the current frame.

The processor may be configured to determine, based on latencies of subsequent event signals, at least one event signal to match the current frame from among the subsequent event signals received between a timing of the current frame and a timing of a subsequent frame.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which.

DETAILED DESCRIPTION

Figure 1:
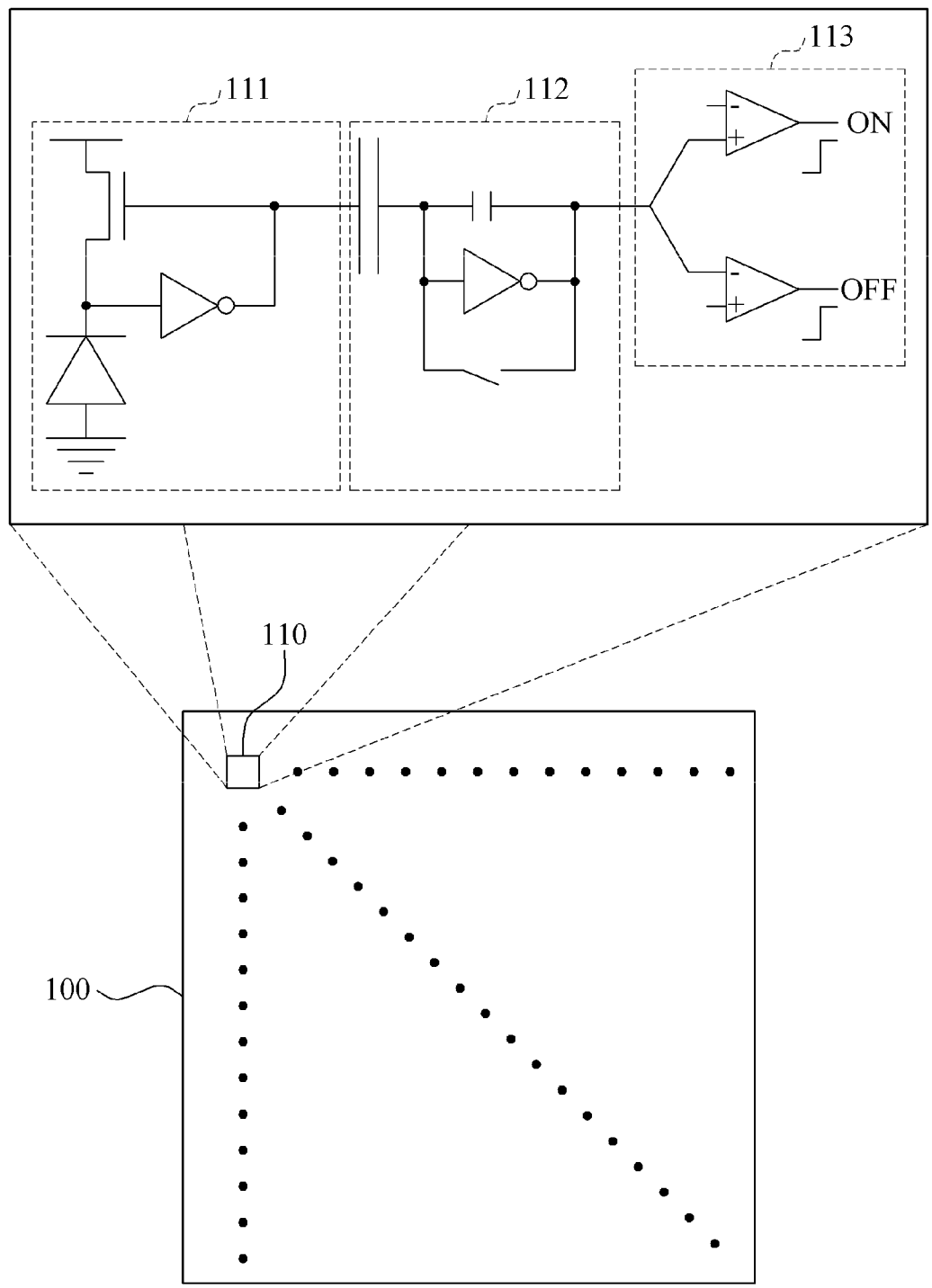
FIG. 1 is a diagram illustrating a configuration of an event-based vision sensor according to an exemplary embodiment.

Hereinafter, exemplary embodiments will be described in detail with reference to the accompanying drawings. Various alterations and modifications may be made to exemplary embodiments, some of which will be illustrated in detail in the drawings and detailed description. However, it should be understood that these exemplary embodiments are not construed as limited to the illustrated forms and include all changes, equivalents or alternatives within the idea and the technical scope of this disclosure. Like reference numerals in the drawings denote like elements, and redundant descriptions of like elements will be omitted herein. Expressions such as "at least one of," when preceding a list of elements, modify the entire list of elements and do not modify the individual elements of the list.

FIG. 1 is a diagram illustrating a configuration of an event-based vision sensor 100 according to an exemplary embodiment.

Hereinafter, descriptions of the event-based vision sensor 100 for use in a motion analysis apparatus will be provided with reference to FIG. 1 and then, descriptions of the motion analysis apparatus will also be provided. Referring to FIG. 1, the event-based vision sensor 100 includes a plurality of sensing elements.

A sensing element 110 included in the event-based vision sensor 100 may output an event signal by sensing an occurrence of a predetermined event. For example, the sensing element 110 may include three stages 111, 112, and 113.

An electrical signal may be output by a first stage 111. In this example, the electrical signal may be proportional to an intensity of light incident on the sensing element 110. For example, a current or a voltage proportional to the intensity of light may be generated (e.g., obtained) at the first stage 111. In FIG. 1, the current may be generated at the first stage 111.

At a second stage 112, a signal obtained by amplifying a change in the intensity of light may be output. For example, at the second stage 112, a DC component of the electrical signal output from the first stage 111 may be removed using a capacitor. A variation of the electrical signal output from the first stage 111 may be amplified at the second stage 112.

An ON event signal or an OFF event signal may be output at a third stage 113. For example, the ON event signal may be output at the third stage 113 when an increment of the electrical signal amplified at the second stage 112 is greater than a threshold (e.g., predetermined) variation. When a decrement of the electrical signal amplified at the second stage 112 is greater than the threshold variation, the OFF event signal may be output at the third stage 113.

The event-based vision sensor 100 may be configured to generate at least one event signal by sensing a portion of an object in which a motion occurs and may include, for example, a dynamic vision sensor (DVS). For example, when the event-based vision sensor 100 senses an event in which an intensity of light increases in a predetermined sensing element, for example, the sensing element 110, the sensing element 110 may output an ON event signal. Also, when the event-based vision sensor 100 senses an event in which the intensity of light decreases in the sensing element 110, the sensing element 110 may output an OFF event signal.

In contrast to a frame-based vision sensor, the event-based vision sensor 100 may output an event signal from the sensing element 110 in which a change in the intensity of light occurs, in lieu of (or in addition to in one or more other exemplary embodiments) scanning an output from each sensing element on a frame-by-frame basis.

An event of changing the intensity of light received by the event-based vision sensor 100 may occur based on a motion of an object. For example, in practice, when a light source is set by a lapse of time, and when the object does not independently emit light, the light received to the event-based vision sensor 100 may be generated from the light source and reflected by the object. When the object, the light source, and the event-based vision sensor 100 are static, the light reflected by the object in a stationary state may be maintained in practice. Thus, the change in the intensity of light incident on the event-based vision sensor may not occur and the event-based vision sensor 100 may not sense the event of changing a light intensity. Conversely, when the object is moving, the light reflected by the moving object may be changed based on the motion of the object. Thus, a change in a brightness of the light may occur, and the event-based vision sensor 100 may sense the event of the change. In this example, the motion of the object may include a relative motion between the event-based vision sensor 100 and the object occurring due to the motion of the event-based vision sensor 100 as well as a self-motion of the object.

The event signal output in response to the motion of the object may include information generated non-time-synchronously. In this example, the information may be similar to an optic nerve signal transferred from a retina to a brain. For example, the event signal may not be generated with respect to a stationary object, and may be generated in response to sensing a moving object.

As an example, when an intensity of light is increased by at least a predetermined amount in a third sensing element, the event-based vision sensor 100 may output a bit indicating an ON event signal and an address of the third sensing element. As another example, when an intensity of light is increased by at least a predetermined amount in a fourth sensing element, the event-based vision sensor 100 may output a bit indicating an OFF event signal and an address of the fourth sensing element. In this example, an address for each sensing element may be expressed by, for example, at least one of a number, a position, and an index.

In an example, the event-based vision sensor 100 may not output a time at which the change in the intensity of light occurs. According to another exemplary embodiment, the event-based vision sensor 100 may also output a time at which the change in the intensity of light occurs. In this example, a processor configured to process a signal output from the event-based vision sensor 100 may set a point in time at which an event signal is received from the event-based vision sensor 100, as the time at which the change in the intensity of light occurs. In another example, the event-based vision sensor 100 may include a timer. The processor may also receive the time at which the change in the intensity of light occurs. Hereinafter, for increased ease and conciseness, descriptions will be provided based on an example in which the event-based vision sensor 100 sets the point in time at which the processor received the event signal, as the time at which the change in the intensity of light occurs, in lieu of outputting the time at which the change in the intensity of light occurs.

Since the event-based vision sensor 100 uses the address of the sensing element from which the event of changing the intensity of light is sensed or address/time information on the sensing element, a quantity of processed information may be reduced when compared to the frame-based vision sensor. For example, a reaction velocity of an event-based image sensor may be based on a unit less than or equal to a microsecond (p). Hereinafter, for increased ease and conciseness, the event-based vision sensor 100 may also be referred to as a first vision sensor and the frame-based vision sensor may also be referred to as a second vision sensor.

Figure 2:
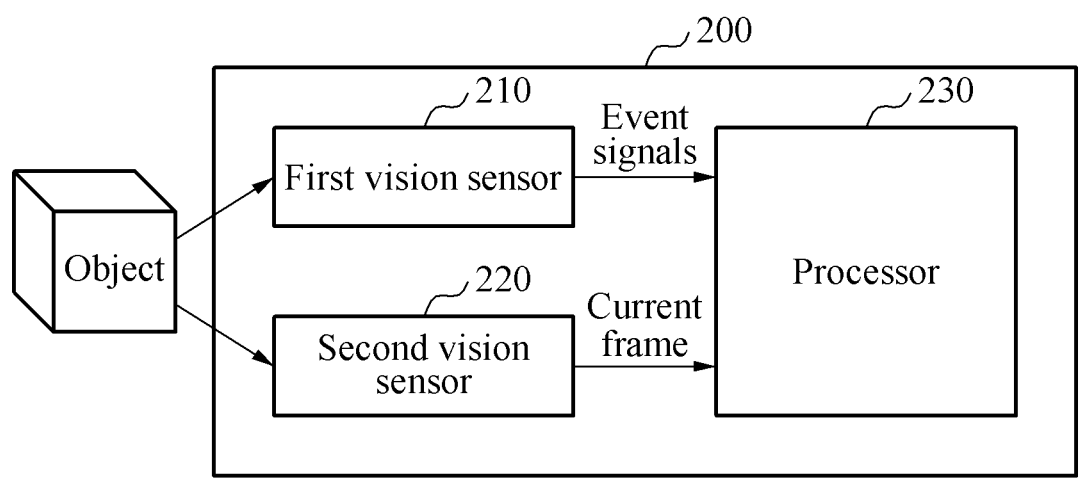
FIG. 2 is a diagram illustrating a motion analysis apparatus according to an exemplary embodiment.

FIG. 2 is a diagram illustrating a motion analysis apparatus 200 according to an exemplary embodiment.

Referring to FIG. 2, the motion analysis apparatus 200 includes a first vision sensor 210, a second vision sensor 220, and a processor 230. In FIG. 2, the motion analysis apparatus 200 may extract depth information of an object in order to analyze a motion of the object.

As an example, the motion analysis apparatus 200 may be an apparatus for analyzing a motion of an object using a vision sensor, and may include, for example, a mobile device such as a mobile phone, a smartphone, a portable multimedia player (PMP), a personal digital assistant (PDA), a tablet computer, and the like; a wearable device such as a smart watch, smart glasses, and the like; a smart appliance such as a smart television (TV), a smart refrigerator, a smart doorlock, and the like; a common computing device such as a laptop computer, a personal computer, and the like; and a dedicated computing device such as a navigation system, an automatic teller machine (ATM), a ticketing machine, and the like. The motion analysis apparatus 200 may include various modules to analyze a motion. The modules included in the motion analysis apparatus 200 may be implemented by a hardware module (e.g., circuitry), a software module, or a combination thereof.

The first vision sensor 210 may be configured to generate at least one event signal by sensing at least a portion of an object in which a motion occurs. The first vision sensor 210 may output event signals by sensing events in which light received from an object is changed non-time-synchronously. Since the descriptions provided with reference to FIG. 1 are also applicable here, repeated descriptions with respect to the first vision sensor 210 will be omitted for increased clarity and conciseness.

The second vision sensor 220 may output a current frame by capturing the object time-synchronously. The second vision sensor 220 may be a frame-based vision sensor and include, for example, a complementary metal-oxide-semiconductor (CMOS) image sensor (CIS). As an example, the second vision sensor 220 may be synchronized with a global clock, and use a frame synchronization (sync) signal satisfying a predetermined number of frames per second. The second vision sensor 220 may output pixel data on a corresponding frame in each time interval during which the frame sync signal indicates ON. The second vision sensor 220 may output a series of frames set as, for example, 30 frames per second, 60 frames per second, etc.

The second vision sensor 220 may provide high resolution image data, and also provide image data on a stationary object as well as a moving object.

The processor 230 may synchronize the current frame and the event signals received from the first vision sensor 210 and the second vision sensor 220, and extract depth information of the object based on the synchronized event signals and current frame. Also, the processor 230 may analyze a motion of the object based on the depth information of the object. Related descriptions about an operation in which the processor 230 extracts the depth information of the object and analyzes the motion of the object will be provided with reference to FIGS. 3 through 15.

Figure 3:
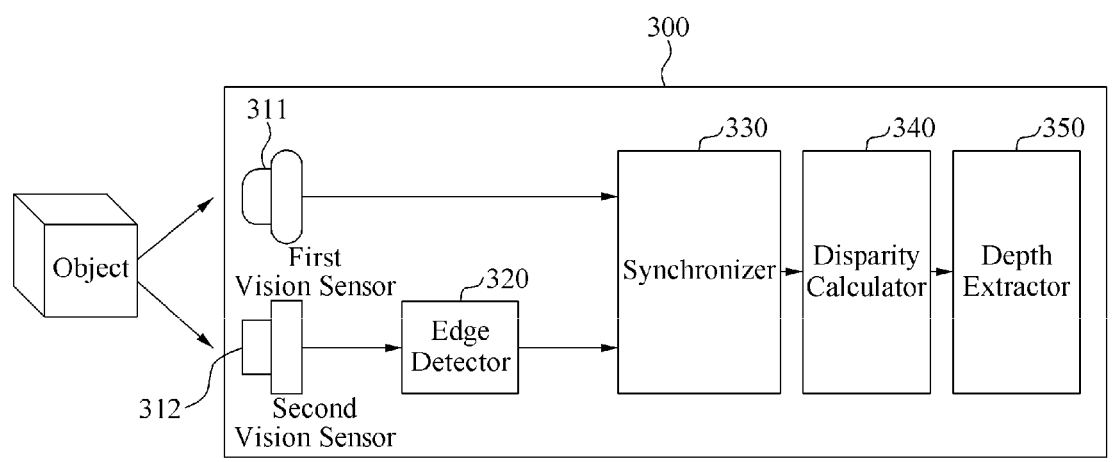
FIG. 3 is a diagram illustrating a motion analysis apparatus extracting depth information of an object according to an exemplary embodiment.

FIG. 3 is a diagram illustrating a motion analysis apparatus 300 extracting depth information of an object according to an exemplary embodiment.

Referring to FIG. 3, the motion analysis apparatus 300 includes a first vision sensor 311, a second vision sensor 312, an edge detector 320, a synchronizer 330, a disparity calculator 340, and a depth extractor 350. The edge detector 320, the synchronizer 330, the disparity calculator 340, and the depth extractor 350 may be included in the processor 230 of FIG. 2. Alternatively, operations of the edge detector 320, the synchronizer 330, the disparity calculator 340, and the depth extractor 350 may be performed by the processor 230 of FIG. 2.

The first vision sensor 311 may be configured to generate at least one event signal by sensing at least a portion of an object in which a motion occurs. The first vision sensor 311 may sense events in which light received from the object is changed non-time-synchronously, and output event signals in response to the sensed events. The second vision sensor 312 may output a current frame by capturing the object non-time synchronously.

The edge detector 320 may detect an edge from the current frame and generate an edge image. The edge detector 320 may generate an edge image representing an edge of an image included in the current frame based on a mathematical algorithm, for example, Canny edge detection. Hereinafter, for increased ease and conciseness, the current frame used in the synchronizer 330 and the disparity calculator 340 may indicate the edge image generated in the edge detector 320, although it is understood that one or more other exemplary embodiments are not limited thereto.

The synchronizer 330 may synchronize the event signals and the current frame. The synchronizer 330 may temporally match the current frame and the event signals received between a timing of a previous frame and a timing of the current frame. For example, the timing of the previous frame and the timing of the current frame may indicate a timing corresponding to a frame sync signal. Also, the synchronizer 330 may synchronize the event signals and the current frame based on a latency of the event signals and a latency of the current frame.

The latency may refer to, for example, a time difference between a point in time at which a vision sensor senses an event and generates a signal and a point in time at which a processor receives the signal output from the vision sensor. As an example, the latency may include at least one of an arbitration delay and a communication delay, which may or may not be predetermined. The arbitration delay may be, for example, a time difference between a point in time at which the vision sensor generates the signal in response to sensing the event and a point in time at which the vision sensor outputs the generated signal. The communication delay may be, for example, a time difference between the point in time at which the vision sensor outputs the generated signal and the point in time at which the processor receives the output signal. In this example, the arbitration delay may indicate a delay due to an operation of an arbiter, which is included in a vision sensor, outputting a signal generated in the vision sensor in response to sensing an event, for example, light. Also, the communication delay may indicate a delay occurring due to a communication protocol, for example, a four-phase handshake protocol, between a vision sensor and a processor.

As an example, a latency of an event signal may indicate a time difference between a point in time at which an event signal is generated in the first vision sensor 210 of FIG. 2 and a point in time at which the event signal is received by the processor 230 of FIG. 2. A latency of pixel information included in a current frame may indicate a time difference between a point in time at which pixel information is generated in the second vision sensor 220 of FIG. 2 and a point in time at which pixel information is received by the processor 230 of FIG. 2.

Figure 4:
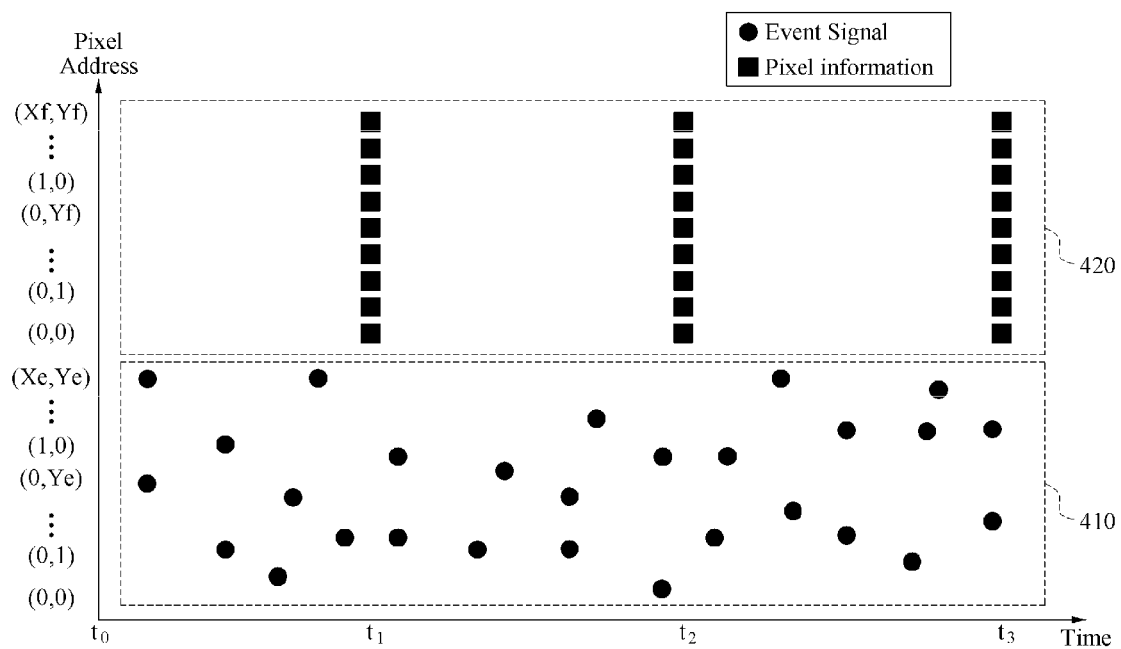
FIG. 4 is a diagram illustrating a timing at which a processor receives event signals and a current frame according to an exemplary embodiment.
Figure 5:
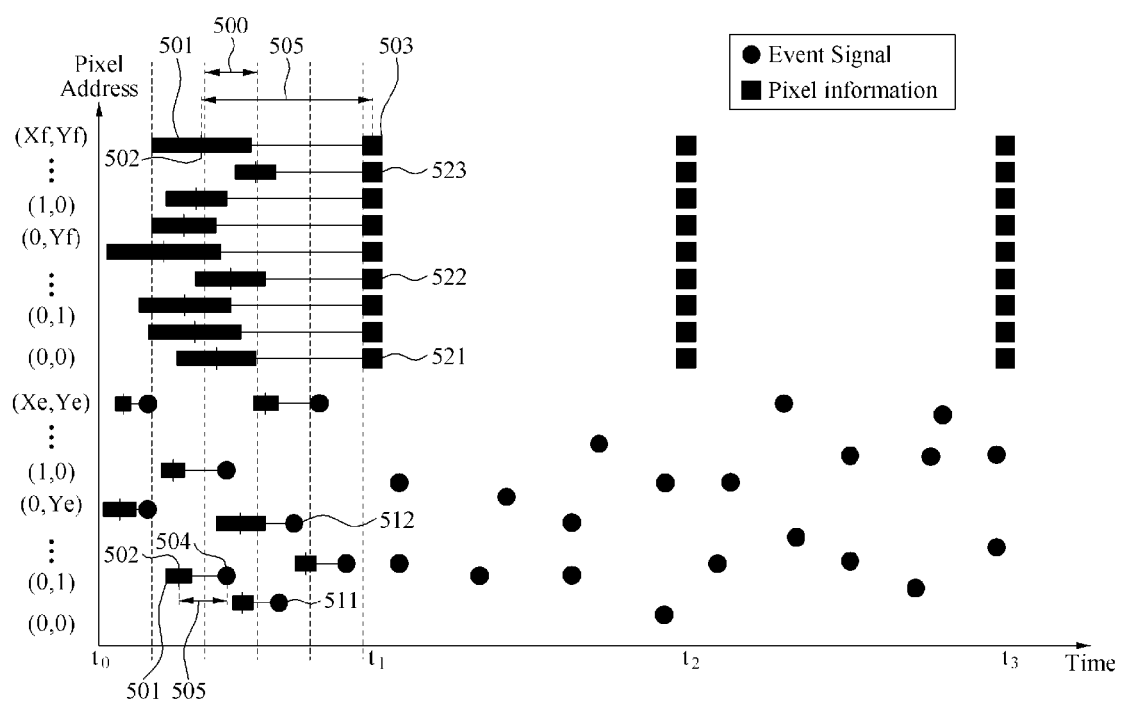
FIG. 5 is a diagram illustrating an example of synchronizing a current frame and event signals based on latency according to an exemplary embodiment.
Figure 6:
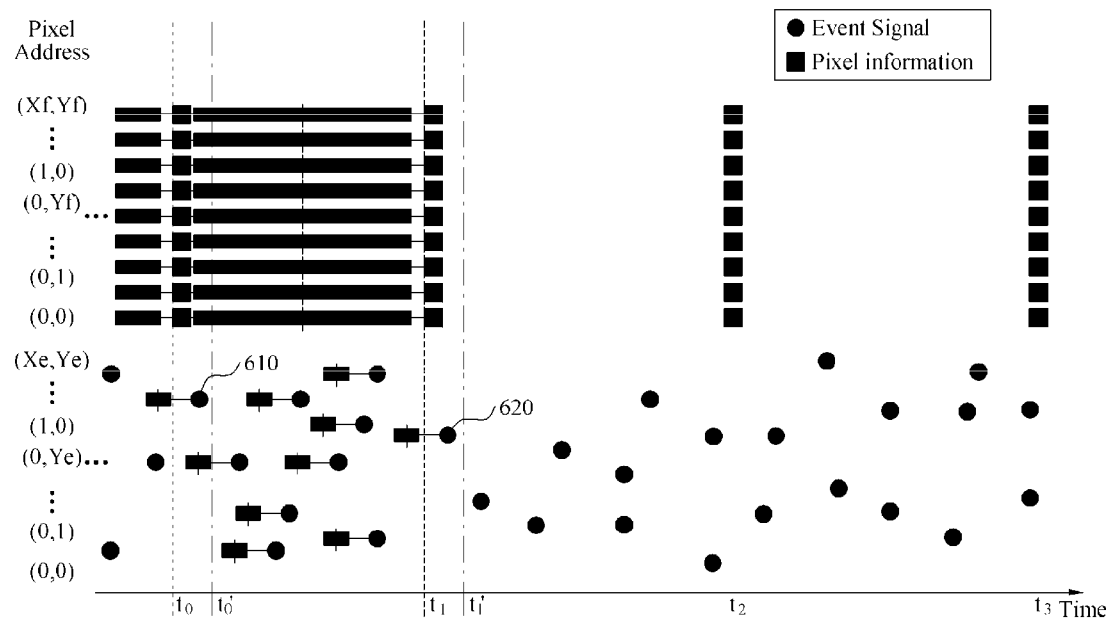
FIG. 6 is a diagram illustrating another example of synchronizing a current frame and event signals based on latency according to an exemplary embodiment.

Related descriptions about an operation of the synchronizer 330 synchronizing the event signals and the current frame will also be provided with reference to FIGS. 4 through 6.

The disparity calculator 340 may calculate a disparity based on the synchronized event signals and current frame. The disparity calculator 340 may calculate the disparity based on the synchronized event signals and current frame using a disparity calculation method used in a related technical field in general. Related descriptions about an operation of the disparity calculator 340 will also be provided with reference FIG. 7.

In this example, the disparity may indicate a positional difference of an object. The positional difference may be provided between signals output from two vision sensors disposed to be spaced apart at a predetermined interval in a same (e.g., identical) direction. The disparity may have a characteristic of increasing according to a decrease in a distance between the object and the two vision sensors.

The depth extractor 350 may extract depth information of the object based on the calculated disparity. For example, a value in the depth information extracted by the depth extractor 350 may be reduced according to an increase in the calculated disparity. The depth extractor 350 may extract the depth information of the object from the disparity based on a related art algorithm.

The motion analysis apparatus 300 may also include an event storage and a frame grabber. The event storage may provide the event signals, received from the first vision sensor, to the synchronizer 330 such that the event signals are processed in the motion analysis apparatus 300. The frame grabber, for example, a frame grabber 822 of FIG. 8, may provide the current frame, received from the second vision sensor 312, to the synchronizer 330 such that the current frame is processed in the motion analysis apparatus 300.

FIG. 4 is a diagram illustrating a timing at which a processor receives event signals and a current frame according to an exemplary embodiment.

FIG. 4 illustrates event signals 410 received from a first vision sensor and a plurality of frames 420 received from a second vision sensor. In FIG. 4, a square symbol or a circle symbol may represent a point in time at which a processor receives a signal output from a vision sensor. In this example, the first vision sensor may use an Xe×Ye sensing element matrix, and the second vision sensor may use an Xf×Yf sensing element matrix. In an example, the first vision sensor may support a resolution identical to or different from that of the second vision sensor. When each of the first vision sensor and the second vision sensor supports a different resolution from the other, a sensing element of the first vision sensor may not directly match a sensing element of the second vision sensor in a one-to-one relationship. In this example, the processor may spatially match event signals of the first vision sensor and a frame of the second vision sensor.

As illustrated in FIG. 4, each of the plurality of frames 420 may be received from the second vision sensor at a predetermined interval, and the event signals 410 may be received from the second vision sensor at irregular intervals. Also, all items of pixel information included in the current frame may be received at a predetermined point in time, for example, a timing of the current frame. To synchronize the event signals and the current frame, the processor may store the event signals received from the first vision sensor in an event storage. In this example, information stored in the event storage may include time information, for example, a timestamp indicating a reception time and an address of a sensing element outputting the event signals.

FIG. 5 is a diagram illustrating an example of synchronizing a current frame and event signals based on latency according to an exemplary embodiment.

For increased ease and conciseness, descriptions will be provided based on event signals and a current frame received between a timing t0 and a timing t1 with reference to FIG. 5.

In FIG. 5, a bar 501 represents a period of time during which a first vision sensor or a second vision sensor monitors an object to output a signal, and a vertical line 502 intersecting a center of the bar 501 represents an actual point in time at which a processor monitors the object indicated by a received signal. In this example, a time difference 505 between the vertical line 502 and a square symbol 503 or a circle symbol 504 may indicate a latency of the signal.

In FIG. 5, vertical dashed lines represent lines segmenting a time-bin for synchronization. Referring to FIG. 5, since the time-bin segmented by the vertical dashed lines is shorter than a time interval for receiving a plurality of frames output from the second vision sensor, pixel information included in the current frame may be synchronized with the event signals.

The processor may synchronize pixel information and event signals of which actual points in time of monitoring an object are included in an identical time-bin. For increased ease and conciseness, descriptions of synchronization of the event signals and the pixel information will be provided based on a predetermined time-bin 500. The processor may synchronize event signals 511 and 512, and items 521, 522, and 523 of pixel information of which actual points in time of monitoring an object are included in the predetermined time-bin 500. Similarly, the processor may synchronize event signals and pixel information based on actual points in time of monitoring an object included in another time-bin.

FIG. 6 is a diagram illustrating another example of synchronizing a current frame and event signals based on latency according to an exemplary embodiment.

In FIG. 6, an individual latency of a signal received from a vision sensor may not be recognizable. In this example, a time-bin may be segmented based on a timing of receiving each frame. Descriptions will be provided using a time-bin set based on a previous frame timing $t_0$ and a current frame timing $t_1$.

Since the individual latency of the signal received from the vision sensor is not recognizable, latencies of all signals received from the visions sensor may not be determined in advance. For example, the predetermined latency may indicate an average latency obtained by experimentally repeating measurements in advance.

The processor may match event signals and a current frame received between a previous frame timing $t_0$ and a current frame timing $t_1$. Also, the processor may match the event signals and the current frame based on a predetermined latency.

Referring to FIG. 6, an object indicated by an event signal 610 may be monitored before the previous frame timing $t_0$. Thus, although the event signal 610 is received between the previous frame timing $t_0$ and the current frame timing $t_1$, the event signal 610 may match the previous frame in lieu of the current frame.

Also, an object indicated by an event signal 620 may be monitored before the current frame timing $t_1$. Thus, although the event signal 620 is received between the current frame timing $t_1$ and a subsequent frame timing $t_2$, the event signal may match the current frame in lieu of a subsequent frame.

As described above, the synchronization may be appropriately performed in consideration of the latency.

As an example, the processor may match event signals and a current frame received between a timing $t_0'$ to which a predetermined latency is delayed from the previous frame timing $t_0$ and a timing $t_1'$ to which the predetermined latency is delayed from the current frame timing $t_0'$. By synchronizing based on a timing to which the predetermined latency is delayed, the processor may match the event signal 610 to the previous frame in lieu of the current frame, and match the event signal 620 to the current frame in lieu of the subsequent frame.

As another example, the processor may match current event signals received between the previous frame timing $t_0$ and the current frame timing $t_1$, to the current frame. Additionally, the processor may determine at least one event signal to match the previous frame from among the current event signals based on latencies of the current event signals, thereby matching the at least one event signal to the previous frame in lieu of the current frame. In FIG. 6, from among current event signals received between the previous frame timing $t_0$ and the current frame timing $t_1$, the event signal 610 may be determined as at least one event signal to match the previous frame in lieu of the current frame, and may match the previous frame.

As still another example, the processor may not match subsequent event signals, received between the current frame timing $t_1$ and the subsequent frame timing $t_2$, to the current frame. Additionally, the processor may determine at least one event signal to match the current frame from among the subsequent event signals based on latencies of the subsequent event signals, thereby matching the current frame in lieu of the subsequent frame. In FIG. 6, from among subsequent event signals received between the current frame timing $t_1$ and the subsequent frame timing $t_2$, the event signal 620 may be determined as at least one event signal to match the current frame in lieu of the subsequent frame, and may match the current frame.

The aforementioned methods may be mathematically expressed by matching pixel information $f_j$ included in the current frame to an event signal $e_i$ satisfying a condition expressed in Equation 1.

$$t_{n-1} < e_i - e_L < t_n \text{ and}$$

$$t_{n-1} < f_i - f_L < t_n \qquad \text{[Equation 1]}$$

In Equation 1, $e_L$ denotes a latency of the event signal $e_i$, and $f_L$ denotes a latency of the pixel information $f_i$ included in the current frame. $t_{n-1}$ and $t_n$ denote timings of segmenting a time-bin for which the synchronization is to be performed.

Figure 7:
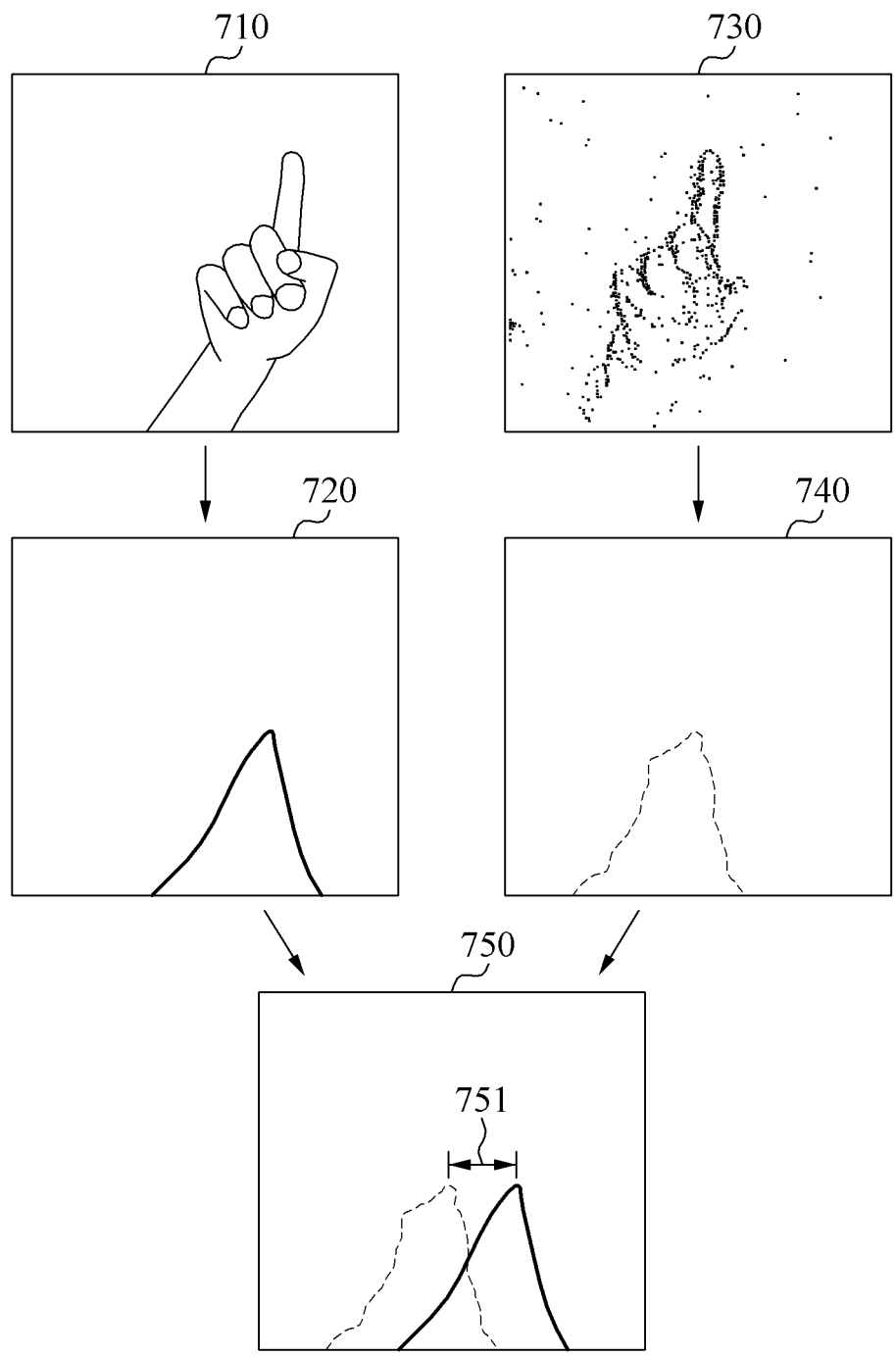
FIG. 7 is a diagram illustrating an example of calculating a disparity according to an exemplary embodiment.

FIG. 7 is a diagram illustrating an example of calculating a disparity according to an exemplary embodiment.

Referring to FIG. 7, a current frame 710 may be generated by time-synchronously capturing an object, for example, a hand. The current frame 710 may be received from a second vision sensor. Event signals 730 may be signals related to light received from the object and changing non-time-synchronously. The event signals 730 may be received from a first vision sensor. For example, the event signals 730 may be generated in response to events in which light reflected from the object is changed based on a motion of the object. FIG. 7 illustrates a result obtained by temporally synchronizing the current frame 710 and the event signals 730.

A processor may calculate a disparity by comparing pixel information on one axis of the current frame 710 and an event signal positioned on the one axis among the event signals 730. As an example, since the disparity may exist in a horizontal direction in lieu of a vertical direction in general, the processor may calculate the disparity by comparing pixel information on an x axis of a synchronized current frame, for example, the current frame 710 and an event signal positioned on the x axis among the event signals 730.

For example, the processor may generate a histogram 720 by projecting the current frame 710 onto the x axis. The histogram 720 may indicate a cumulative result obtained by projecting, onto the x axis, pixel information associated with a shape of the object in the current frame 710. Similarly, the processor may generate a histogram 740 by projecting synchronize event signals, for example, the event signals 730, onto the x axis.

The processor may calculate the disparity by overlapping the histogram 720 generated based on the current frame 710 and the histogram 740 generated based on the event signals 730 as indicated by an image 750. For example, the processor may calculate the disparity based on a distance difference 751 resulting in the overlapping of the histogram 720 and the histogram 740. The disparity may increase proportionally to the distance difference 751.

Figure 8:
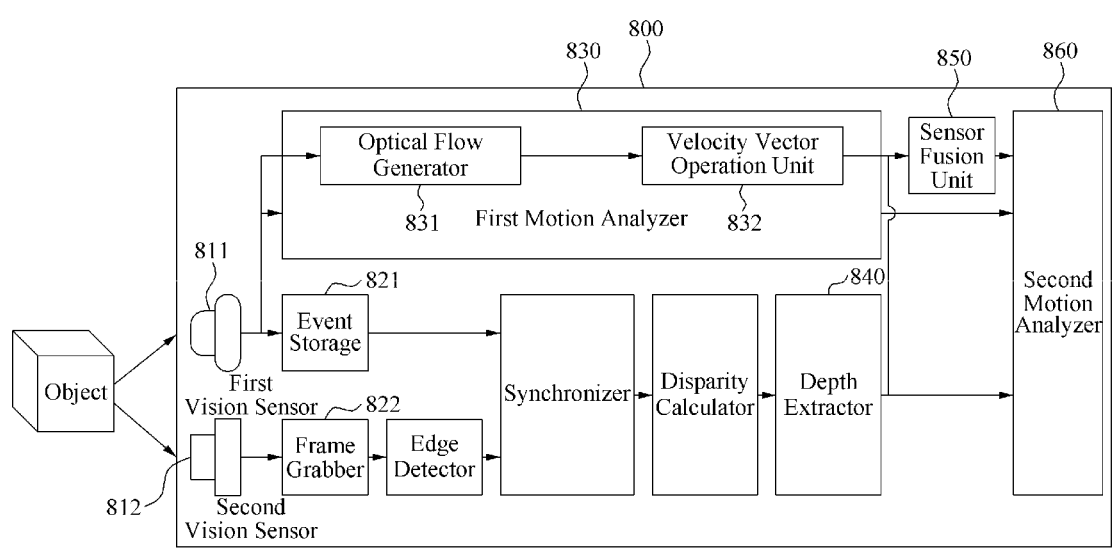
FIG. 8 is a diagram illustrating a motion analysis apparatus analyzing a motion of an object according to an exemplary embodiment.

FIG. 8 is a diagram illustrating a motion analysis apparatus 800 analyzing a motion of an object according to an exemplary embodiment.

Referring to FIG. 8, the motion analysis apparatus 800 may further include an event storage 821, a frame grabber 822, a first motion analyzer 830, a sensor fusion unit 850 (e.g., sensor fuser), and a second motion analyzer 860 when compared to the motion analysis apparatus 300 of FIG. 3. In this example, the event storage 821, the frame grabber 822, the first motion analyzer 830, the sensor fusion unit 850, and the second motion analyzer 860 may be included in the processor 230 of FIG. 2. Alternatively, operations of the event storage 821, the frame grabber 822, the first motion analyzer 830, the sensor fusion unit 850, and the second motion analyzer 860 may be performed by the processor 230 of FIG. 2.

The event storage 821 may store event signals received from a first vision sensor 811 such that the event signals are processed in the motion analysis apparatus 800.

The frame grabber 822 may store a current frame received from a second vision sensor 812 such that the current frame is processed in the motion analysis apparatus 800.

The first motion analyzer 830 may analyze a motion of an object based on the event signals received from the first vision sensor 811. An operation performed by the first motion analyzer 830 may include an operation of an optical flow generator 831 and an operation of a velocity vector operation unit 832 (e.g., velocity vector operator).

The optical flow generator 831 may generate an optical flow based on the event signals received from the first vision sensor 811. The optical flow may be, for example, a velocity vector related to an event of changing light received from an object. For example, the optical flow may include a set of velocity vectors corresponding to a plurality of events sensed by the first vision sensor 811. When the object moves relative to the first vision sensor 811, an intensity of light received by the first vision sensor 811 may be changed. The optical flow may express an event of the changing in a form of a two-dimensional (2D) vector.

The velocity vector operation unit 832 may obtain at least one velocity vector corresponding to an event signal received based on the generated optical flow. In this example, the at least one velocity vector may include a planar velocity vector, a Z-axial velocity vector, and an angular velocity vector. The Z-axial velocity vector may indicate, for example, a velocity vector moving in an identical direction when compared to depth information extracted by a depth extractor 840.

Related descriptions about operations of the optical flow generator 831 and the velocity vector operation unit 832 included in the first motion analyzer 830 will also be provided with reference to FIGS. 9 through 13.

The sensor fusion unit 850 may compensate for the depth information extracted by the depth extractor 840 with respect to the object, based on the at least one velocity vector obtained in the first motion analyzer 830. For example, the sensor fusion unit 850 may compensate for the depth information of the object based on the Z-axial velocity vector obtained by the first motion analyzer 830. Since the depth extractor 840 uses the current frame received from the second vision sensor 812, the depth extractor 840 may have a longer update interval when compared to the first motion analyzer 830 using the event signals received from the first vision sensor 811 of which a reaction velocity is faster than that of the second vision sensor 812. For example, while a single item of depth information is extracted by the depth extractor 840, the Z-axial velocity vector obtained by the first motion analyzer 830 may be updated continuously. As an example, the depth extractor 840 may maintain most recently extracted depth information until subsequent depth information is extracted.

The sensor fusion unit 850 may calculate a value of depth information extracted at a predetermined update interval based on the Z-axial velocity vector of the first motion analyzer 830 and the depth information of the depth extractor 840. The sensor fusion unit 850 may compensate for the depth information extracted by the depth extractor 840 by calculating the value of the depth information extracted at the predetermined update interval.

The second motion analyzer 860 may compensate for the motion of the object analyzed by the first motion analyzer 830 based on the at least one velocity vector obtained by the first motion analyzer 830 and the depth information on which the sensor fusion unit 850 performs compensation.

In an example, the first motion analyzer 830 may analyze the motion of the object based on the at least one velocity vector in lieu of the depth information. Thus, the first motion analyzer 830 may analyze, as the same motion, a motion of a small-sized object moving over a short distance from the motion analysis apparatus 800 and a motion of a large-sized object moving over a long distance from the motion analysis apparatus 800. The second motion analyzer 860 may further use the depth information to analyze the motion of the object. Thus, the second motion analyzer 860 may analyze the motion analyzed as the same motion in the first motion analyzer 830, to be a different motion.

In another example, the second motion analyzer 860 may further use a user input context to analyze the motion of the object. The user input context may include, for example, at least one of a type of an application that is being currently executed, stored history information, sensor information, and peripheral device information. The second motion analyzer 860 may differently analyze the motion of the object based on equivalent velocity vectors and depth information using the user input context, thereby providing user-dedicated interfacing technology. For example, although the object performs the same motion, the second motion analyzer 860 may analyze the motion as a different command based on the type of the application that is being executed. When a driving game application is being executed, the second motion analyzer 860 may analyze a motion A as a command to rotate a handle of a vehicle in a counterclockwise direction. When an image edition application is being executed, the second motion analyzer 860 may analyze the motion A as a command to rotate an image in the counter-clockwise direction. Also, when a multimedia playback application is being executed, the second motion analyzer 860 may analyze the motion A as a command to rewind multimedia contents.

Additionally, the motion analysis apparatus 800 may perform an operation based on a motion analyzed based on the user input context. For example, when a music playback application is being executed, the motion analysis apparatus 800 may analyze a motion C as a command to activate a mute function and perform the mute function.

In still another example, the motion analysis apparatus 800 may not include the sensor fusion unit 850. In this example, the second motion analyzer 860 may analyze the motion of the object based on the at least one velocity vector acquired (e.g., obtained) by the first motion analyzer 830 and the depth information acquired by the depth extractor 840. Since the aforementioned descriptions are also applicable to the second motion analyzer 860 using the depth information acquired by the depth extractor 840 in lieu of the depth information obtained through the compensation performed based on the Z-axial velocity vector, repeated descriptions will be omitted for increased clarity and conciseness.

Figure 9:
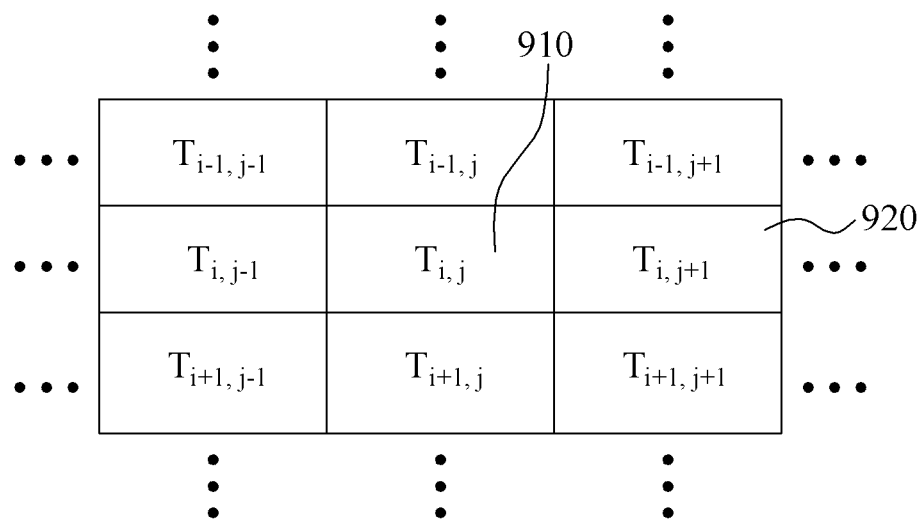
FIG. 9 is a diagram illustrating a timestamp used to generate an optical flow according to an exemplary embodiment.

FIG. 9 is a diagram illustrating a timestamp used to generate an optical flow according to an exemplary embodiment.

Referring to FIG. 9, in response to a reception of an event signal, the processor 230 of FIG. 2 may update an event map 900 based on the event signal. The event map 900 may include a plurality of map elements storing a timestamp of a plurality of event signals. Each of the map elements may store a timestamp indicating a most recent time of receiving an event signal matching a corresponding map element. For example, $T_{i,j}$ may indicate the most recent time of receiving an event signal corresponding to a map element 910 positioned at (i, j), and $T_{i,j+1}$ may indicate the most recent time of receiving an event signal corresponding to a map element 920 positioned at (i, j+1).

In response to the reception of the event signal, a processor may update a map element corresponding to the event signal. The processor may perform an update on only the map element corresponding to the event signal in lieu of performing the update on all map elements. For example, the processor may detect a map element corresponding to a received event signal from among the plurality of map elements included in the event map 900, and update a timestamp of the detected map element with a timestamp indicating a time of receiving the received event signal.

Figure 10:
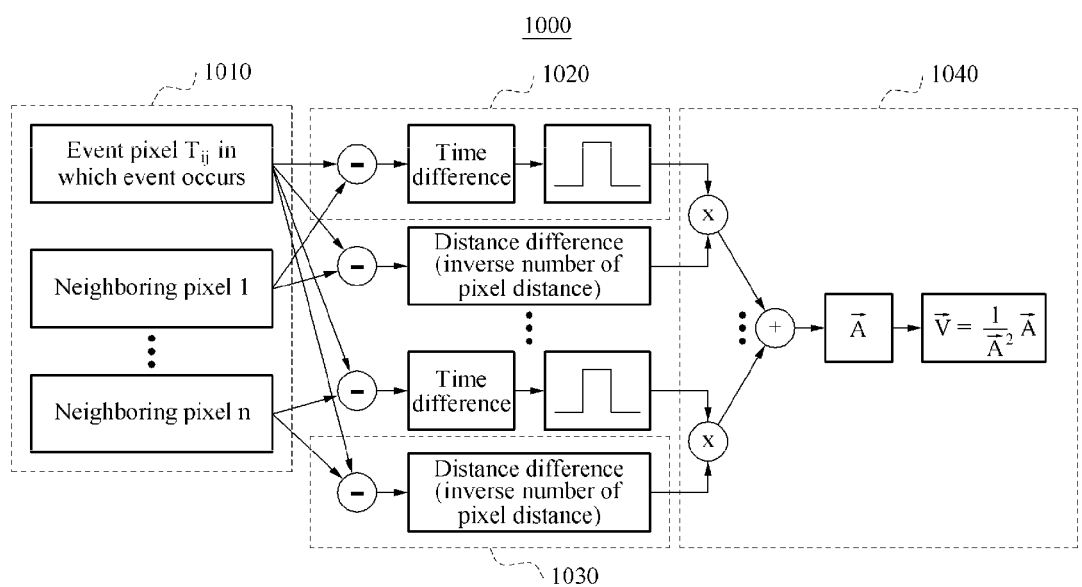
FIG. 10 is a diagram illustrating an example of generating an optical flow according to an exemplary embodiment.

FIG. 10 is a diagram illustrating an example of generating an optical flow according to an exemplary embodiment.

Referring to FIG. 10, an optical flow generator 1000 includes a neighboring map element acquirer 1010, a time difference calculator 1020, a distance difference calculator 1030, and an optical flow calculator 1040. Each module of FIG. 10 may be implemented by software, hardware, or a combination of software and hardware. For example, each of the neighboring map element acquirer 1010, the time difference calculator 1020, the distance difference calculator 1030, and the optical flow calculator 1040 may be implemented by a processor, a memory, a hardware accelerator (HWA), a field programmable gate array (FPGA), or combinations thereof.

The neighboring map element acquirer 1010 may acquire (e.g., obtain) a plurality of map elements based on a map element corresponding to a received event signal. For example, the map element corresponding to the received event signal may be a map element corresponding to a sensing element from which the event signal is output in a first vision sensor.

In an example, the neighboring map element acquirer 1010 may acquire eight neighboring map elements directly neighboring the map element corresponding to the received event signal. In another example, the neighboring map element acquirer 1010 may additionally acquire 16 neighboring map elements surrounding the eight neighboring map elements as well as the eight neighboring map elements.

The time difference calculator 1020 may calculate information associated with a time difference between the map element corresponding to the received event signal and the neighboring map elements of the map element, based on a timestamp stored in the event map 900 of FIG. 9.

As an example, the processor may receive a new event signal corresponding to the map element 910 of FIG. 9. The time difference calculator 1020 may calculate a difference between a time $T_{i,j}$ stored in the map element 910 and a time $T_{i+1,j+1}$ stored in a neighboring map element, for example, the map element 920 as illustrated in FIG. 9. In this example, the time $T_{i,j}$ stored in the map element 310 may be in a state updated in response to the receiving of the new event signal and thus, a value of $T_{i,j}-T_{i,j+1}$ may be greater than or equal to "0". For example, when event signals corresponding to the map element 910 and the map element 920 are received simultaneously, the value of $T_{i,j}-T_{i,j+1}$ may be "0". The time difference calculator 1020 may calculate the time difference for each of the plurality of neighboring map elements acquired by the neighboring map element acquirer 1010. Also, when the calculated time difference is beyond a predetermined time window range, for example, 0.1 seconds, the time difference calculator 1020 may count the calculated time difference as meaningless information and thus, output "0" in lieu of the calculated time difference. Through this, the optical flow generator 1000 may remove a factor that may affect a velocity vector corresponding to each map element included in an optical flow as noise.

The distance difference calculator 1030 may calculate information associated with a distance difference between at least one map element corresponding to a received event signal and neighboring map elements of the at least one map element. For example, the distance difference calculator 1030 may calculate an inverse number of a map element distance between a map element corresponding to a new event signal and neighboring map elements of the map element. In this example, the map element distance may include a normalized distance among the plurality of map elements. For example, a map element distance between the map element 910 and the map element 920 of FIG. 9 may be "1". The distance difference calculator 1030 may calculate the inverse number of the map element distance for each of the plurality of neighboring map elements acquired by the neighboring map element acquirer 1010.

The optical flow calculator 1040 may calculate the optical flow based on information associated with the distance difference calculated by the distance difference calculator 1030 and information associated with the time difference calculated by the time difference calculator 1020. Based on the information associated with the distance difference and the information associated with the time difference, the optical flow calculator 1040 may perform an operation by calculating a 2D vector A corresponding to the map element corresponding to the received event signal and dividing the 2D vector A using an inner product value of the 2D vector A.

For example, the optical flow calculator 1040 may multiply the inverse number of the distance difference, to the information associated with the time difference corresponding to each of the neighboring map elements of the map element receiving the event signal. Subsequently, the optical flow calculator 1040 may calculate the 2D vector A by calculating a sum of multiplied results corresponding to the neighboring map elements. The optical flow calculator 1040 may calculate the 2D vector A using Equation 2.

$$\vec{A} = \vec{d} \cdot \Delta t \frac{1}{\|\vec{d}\|^2}$$ [Equation 2]

In Equation 2, Δt denotes the information associated with the time difference, and a 2D vector d denotes the information associated with the distance information. In this example, a unit of the 2D vector A may be "time/distance". The optical flow calculator 1040 may calculate a velocity vector V included in the optical flow by dividing the 2D vector A using the inner product value of the 2D vector A. The optical flow calculator 1040 may calculate the velocity vector V for each map element corresponding to the received event signal, thereby generating an optical flow including a velocity vector of the each map element.

The optical flow generator 1000 may remove a factor that may affect the velocity vector of the each map element included in the optical flow as noise. As described above, the time difference calculator 1020 may output "0" when the time difference between the map element corresponding to the event signal and the neighboring map elements is beyond the predetermined time window. When all time differences between the map element corresponding to the event signal and the neighboring map elements are beyond the predetermined time window, the 2D vector A calculated by the optical flow calculator 1040 may be "0". In this example, the optical flow calculator 1040 may output "0" as a calculated value of the velocity value V in lieu of infinity.

The optical flow generator 1000 may further include at least one of a partial calculator and a full calculator.

In this example, in response to the reception of the event signal, the partial computer may asynchronously calculate a new optical flow for the map element corresponding to the event signal among all map elements included in the event map, and the neighboring map elements of the map element. For example, the partial calculator may calculate velocity vectors for at least one map element corresponding to a received event signal among all map elements and neighboring map elements of the at least one map element.

The full calculator may calculate a new optical flow for all of the map elements at a predetermined interval. For example, the full calculator may determine whether the predetermined interval arrives, and in response to an arrival of the predetermined interval, calculate velocity vectors for all of the map elements.

Since the descriptions provided with reference to FIG. 10 are also applicable here, repeated descriptions with respect to the partial calculator and the full calculator will be omitted for increased clarity and conciseness.

Figure 11:
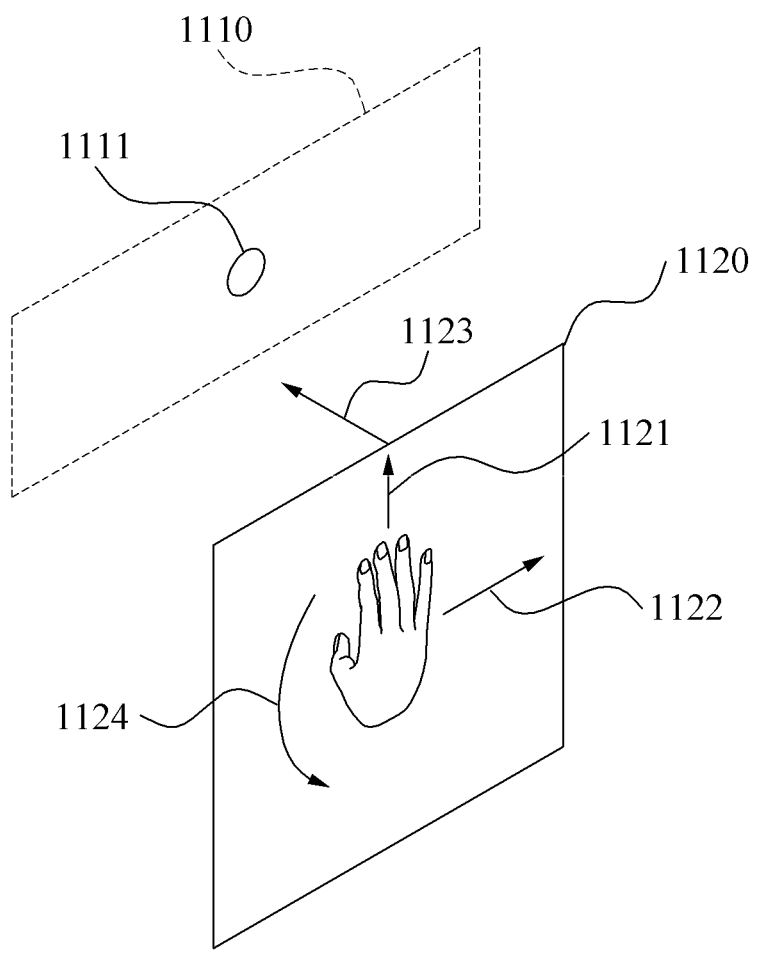
FIGS. 11 through 13 are diagrams illustrating an example of operating a velocity vector according to an exemplary embodiment.
Figure 12:
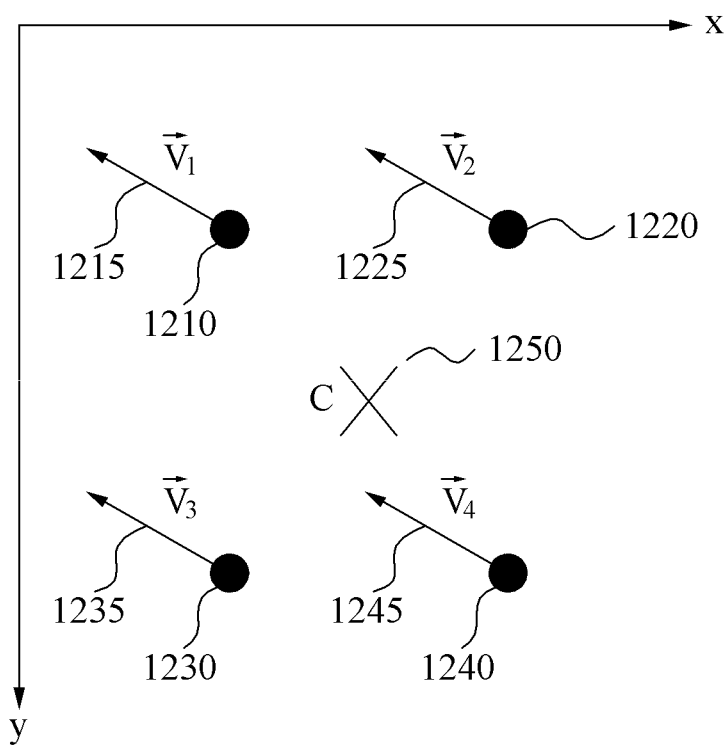
Figure 13:
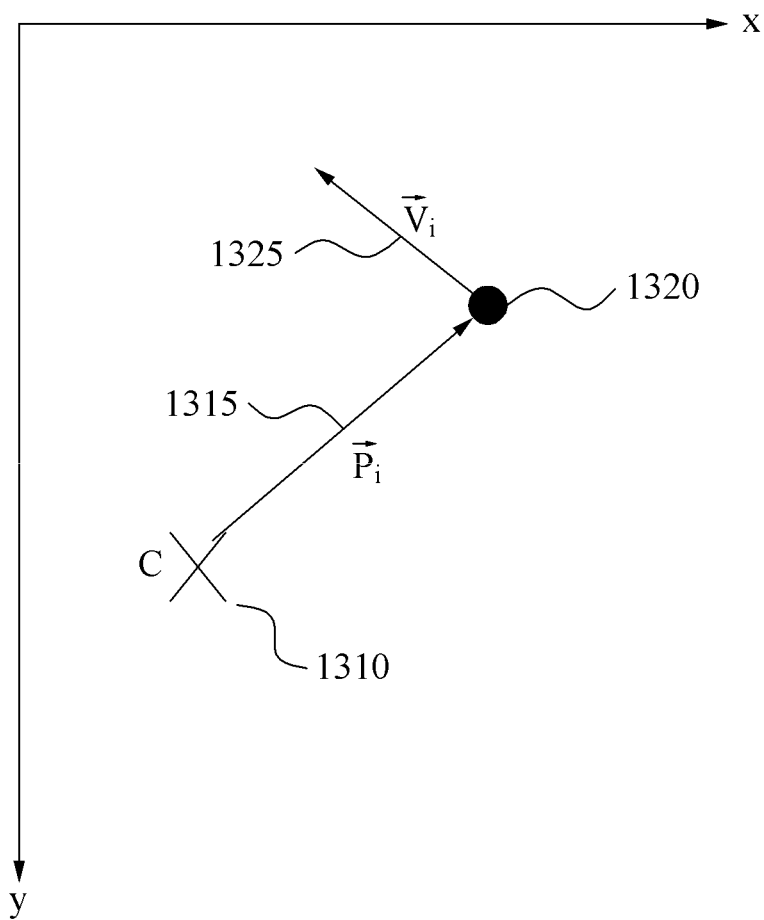

FIGS. 11 through 13 are diagrams illustrating an example of operating a velocity vector according to an exemplary embodiment.

Referring to FIG. 11, velocity vectors may include a first velocity component Vx generated by moving an object in an x-axial direction 1122 on a plane 1120 parallel to a sensor plane 1110 including a first vision sensor 1111, a second velocity component Vy generated by moving the object in a y-axial direction 1121, a third velocity component Vz generated by the object in a perpendicular direction 1123 to the plane 1120, and a fourth velocity component w generated by rotating the object in a counterclockwise direction 1124 on the plane 1120.

The velocity vector operation unit 832 of FIG. 8 may include a planar velocity operation unit (e.g., planar velocity operator), an optical flow center operation unit (e.g., optical flow center operator), a Z-axial velocity operation unit (e.g., Z-axial velocity operator), and an angular velocity operation unit (e.g., angular velocity operator). The planar velocity operation unit may obtain the first velocity component Vx and the second velocity component Vy based on an optical flow. For example, the planar velocity operation unit may obtain an average of the optical flow to obtain the first velocity component Vx and the second velocity component Vy.

As described above, the optical flow may include a velocity vector of a map element corresponding to a received event signal. The planar velocity operation unit may obtain the average of the optical flow by calculating a vector sum of velocity vectors of all map elements. Since each of the velocity vectors of the map element is a 2D vector, the average of the optical flow may be 2D vector. The planar velocity operation unit may obtain the first velocity component Vx and the second velocity component Vy by separating an x-axial component and a y-axial component from the calculated average of the optical flow.

The optical flow center operation unit may obtain a center of the optical flow. For example, to obtain the center of the optical flow, the optical flow center operation unit may perform a centroid operation based on a position of the map element corresponding to the received event signal and a magnitude of a velocity vector of the map element included in the optical flow.

Referring to FIG. 12, for example, when map elements corresponding to a received event signal are a map element 1210, a map element 1220, a map element 1230, and a map element 1240, an optical flow generated by an optical flow generator may include a velocity vector $V_1$ 1215, a velocity vector $V_2$ 1225, a velocity vector $V_3$ 1235, and a velocity vector $V_4$ 1245 corresponding to the map element 1210, the map element 1220, the map element 1230, and the map element 1240, respectively. The optical flow center operation unit may obtain a center C 1250 of the optical flow by applying, to Equation 3, positions of the map element 1210, the map element 1220, the map element 1230, and the map element 1240, and magnitudes of the velocity vector $V_1$ 1215, the velocity vector $V_2$ 1225, the velocity vector $V_3$ 1235, and the velocity vector $V_4$ 1245. In this example, each of the positions may include an x-axial map element coordinate and a y-axial map element coordinate, and each of the magnitudes may include an x-axial direction magnitude and a y-axial direction magnitude.

$$c = \left( \frac{\sum_i |V_{xi}| x_i}{\sum_i |V_{xi}|}, \frac{\sum_i |V_{yi}| y_i}{\sum_i |V_{yi}|} \right) \quad \text{[Equation 3]}$$

The Z-axial velocity operation unit may obtain the third velocity component $V_z$ based on the optical flow and the center of the optical flow. For example, based on a position of the map element corresponding to the received event signal and the center of the optical flow, the Z-axial velocity operation unit may generate a relative position vector corresponding to the map element. Additionally, the Z-axial velocity operation unit may obtain the third velocity component $V_z$ by performing an inner product operation based on the relative position vector and the velocity vector of the map element included in the optical flow.

Referring to FIG. 13, for example, a center C 1310 may be a center of an optical flow obtained by an optical flow center operation unit, and a map element 1320 may be an $i^{th}$ map element among map elements corresponding to a received event signal. A Z-axial velocity operation unit may generate a relative position vector 1315 based on a position of the center C 1310 and a position of the map element 1320. Additionally, the Z-axial velocity operation unit may obtain a third velocity component $V_z$ by applying, to Equation 4, the relative position vector 1315 and a velocity vector 1325 of the $i^{th}$ map element.

$$V_z = \sum_i \vec{p}_i \cdot \vec{V}_i \quad \text{[Equation 4]}$$

Referring back to FIG. 11, when the object is moving in a direction 1123 of decreasing distance from the first vision sensor 1111, the third velocity component $V_z$ obtained by the Z-axial velocity operation unit may obtain a positive value. Conversely, when the object is moving in a direction increasing the distance from the first vision sensor 1111, the third velocity component $V_z$ may obtain a negative value.

The angular velocity operation unit may obtain a fourth velocity component ω based on the optical flow and the center of the optical flow. For example, based on the center of the optical flow and the position of the map element corresponding to the received event signal, the angular velocity operation unit may generate the relative position vector corresponding to the map element. Also, the angular velocity operation unit may obtain the fourth velocity component ω by performing an outer product operation based on the relative position vector and the velocity vector of the map element included in the optical flow.

Referring to FIG. 13, for example, the center C 1310 may be the center of the optical flow obtained by the optical flow center operation unit, and the map element 1320 may be the $i^{th}$ map element among the map elements corresponding to the received event signal. The angular operation unit may generate the relative position vector 1315 based on the position of the center C 1310 and the position of the map element 1320. Additionally, the angular velocity operation unit may obtain the fourth velocity component ω by applying, to Equation 5, the relative position vector 1315 and the velocity vector 1325 of the $i^{th}$ map element.

$$\omega = \sum_i \vec{p}_i \times \vec{V}_i \quad \text{[Equation 5]}$$

Referring back to FIG. 11, when the object is rotating in the counterclockwise direction 1124, the fourth velocity component ω obtained by the angular velocity operation unit may be a positive value. Conversely, when the object is rotating in a clockwise direction, the fourth velocity component ω obtained by the angular velocity operation unit may be a negative value.

Figure 14:
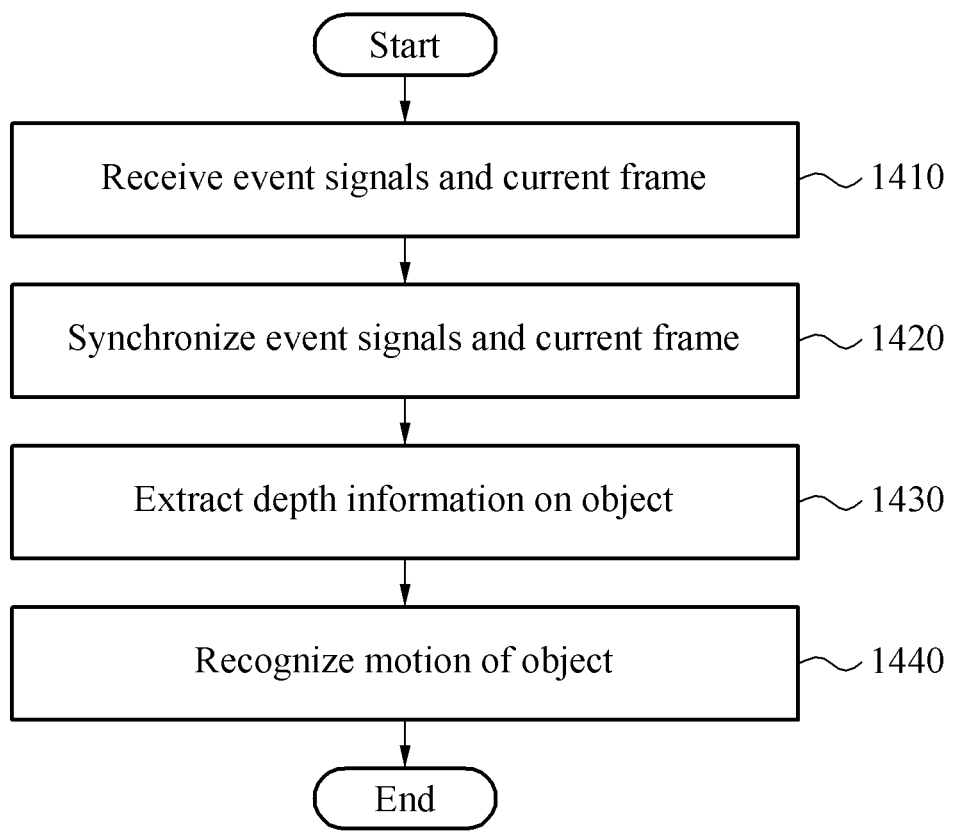
FIG. 14 is a flowchart illustrating a motion analysis method according to an exemplary embodiment.

FIG. 14 is a flowchart illustrating a motion analysis method according to an exemplary embodiment.

Referring to FIG. 14, the motion analysis method performed by a processor included in a motion analysis apparatus includes operation 1410 of receiving event signals from a first vision sensor and a current frame from a second vision sensor, operation 1420 of synchronizing the received event signals and the received current frame, operation 1430 of extracting depth information of an object based on the synchronized event signals and current frame, and operation 1440 of recognizing a motion of the object based on the depth information and a velocity vector corresponding to the received event signals.

Since the descriptions provided with reference to FIGS. 1 through 13 are applicable here, repeated descriptions with respect to FIG. 14 will be omitted for increased clarity and conciseness.

Figure 15:
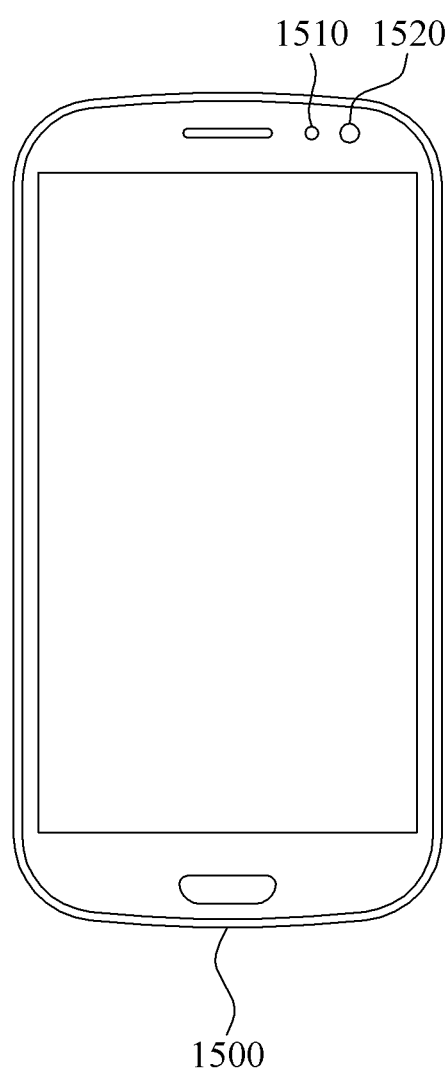
FIG. 15 is a diagram illustrating an example of disposing a first vision sensor and a second vision sensor according to an exemplary embodiment.

FIG. 15 is a diagram illustrating an example of disposing (e.g., providing) a first vision sensor 1510 and a second vision sensor 1520 according to an exemplary embodiment.

Referring to FIG. 15, a motion analysis apparatus 1500 includes the first vision sensor 1510 and the second vision sensor 1520. The first vision sensor 1510 may generate at least one event signal by sensing at least a portion of an object in which a motion occurs, and the second vision sensor 1520 may generate a current frame by time-synchronously capturing the object.

The first vision sensor 1510 and the second vision sensor 1520 may be spaced apart at a predetermined interval, and disposed in an identical direction. Based on a result of disposing the first vision sensor 1510 and the second vision sensor 1520, the motion analysis apparatus 1500 may calculate a disparity based on the event signals of the first vision sensor 1510 and the current frame of the second vision sensor 1520.

As an example, the motion analysis apparatus 1500 may include the first vision sensor 1510 and the second vision sensor 1520 of which positions are switched from one another.

As another example, the first vision sensor 1510 and the second vision sensor 1520 may be disposed on a plane not including a display of the motion analysis apparatus 1500.

According to an aspect of an exemplary embodiment, it is possible to extract a depth of an object and analyze a motion of the object with reduced amounts of time and cost by additional use of an event-based vision sensor in addition to a frame-based vision sensor.

According to another aspect of an exemplary embodiment, it is possible to extract depth information of an object and analyze a motion of the object with increased accuracy by calculating a disparity through synchronization of signals output from an event-based vision sensor and a frame-based vision sensor based on a latency.

According to still another aspect of an exemplary embodiment, it is possible to specifically acquire depth information of an object by compensating for the depth information using a Z-axial velocity vector obtained based on an optical flow despite a relatively low reaction velocity of a frame-based vision sensor.

Exemplary embodiments described herein may be implemented using hardware components and/or software components. For example, the hardware components may include circuitry, microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present inventive concept is not limited thereto. Instead, it will be appreciated by those skilled in the art that changes may be made to these exemplary embodiments without departing from the principles and spirit of the disclosure, the scope of which is defined by the claims and their equivalents.

What is claimed is:

1. A method of analyzing a motion based on depth information, the method comprising:
receiving event signals from a first vision sensor configured to generate at least one event signal by sensing at least a portion of an object in which a motion occurs;
receiving a current frame from a second vision sensor configured to time-synchronously capture the object;
synchronizing the received event signals and the received current frame; and
obtaining depth information of the object based on the synchronized event signals and current frame.

2. The method of claim 1, wherein the first vision sensor comprises an event-based vision sensor configured to generate the at least one event signal in response to an event in which light received from the object is changed non-time-synchronously.

3. The method of claim 1, wherein the synchronizing comprises matching the received current frame and the received event signals, received between a timing of a previous frame and a timing of the current frame.

4. The method of claim 1, wherein the synchronizing comprises matching the received current frame and the received event signals, received between a timing to which a predetermined latency is delayed from a timing of a previous frame and a timing to which the predetermined latency is delayed from a timing of the current frame.

5. The method of claim 1, wherein the synchronizing comprises determining, based on latencies of current event signals, at least one event signal to match a previous frame from among the current event signals received between a timing of the previous frame and a timing of the current frame.

6. The method of claim 1, wherein the synchronizing comprises determining, based on latencies of subsequent event signals, at least one event signal to match the current frame from among the subsequent event signals received between a timing of the current frame and a timing of a subsequent frame.

7. The method of claim 5, wherein the latencies are time differences between points in time at which the current event signals are generated and points in time at which the current event signals are received.

8. The method of claim 1, further comprising:
obtaining an edge image by detecting an edge from the received current frame,
wherein the synchronizing comprises synchronizing the received event signals and the obtained edge image.

9. The method of claim 1, wherein the obtaining comprises obtaining the depth information of the object based on a disparity calculated based on the synchronized event signals and current frame.

10. The method of claim 9, wherein the disparity is calculated by comparing pixel information on a pixel of one axis in the synchronized current frame and an event signal positioned on the one axis among the synchronized event signals.

11. The method of claim 1, further comprising:
analyzing the motion of the object based on the received event signals; and
compensating for the motion of the object based on the depth information of the object and the analyzed motion of the object.

12. The method of claim 11, wherein the analyzing comprises analyzing the motion of the object based on an optical flow including at least one velocity vector related to the received event signals.

13. The method of claim 12, further comprising:
compensating for the depth information of the object by using a velocity vector obtained based on the optical flow,
wherein the velocity vector corresponds to the received event signals.

14. The method of claim 1, wherein the receiving the current frame comprises receiving the current frame from a frame-based vision sensor configured to capture the object based on a predetermined number of frames per second.

15. The method of claim 1, wherein the first vision sensor and the second vision sensor are spaced apart at a predetermined interval and disposed in a same direction.

16. A non-transitory computer-readable recording medium having recorded thereon a program executable by a computer to implement the method of claim 1.

17. An apparatus for analyzing a motion based on depth information, the apparatus comprising:
a first vision sensor configured to generate at least one event signal by sensing at least a portion of an object in which a motion occurs;
a second vision sensor configured to generate a current frame by time-synchronously capturing the object; and
a processor configured to synchronize the generated at least one event signal received from the first vision sensor and the generated current frame received from the second vision sensor, and to obtain depth information of the object based on the synchronized event signals and current frame.

18. The apparatus of claim 17, wherein the first vision sensor comprises an event-based vision sensor configured to generate the at least one event signal in response to an event in which light received from the object is changed non-time-synchronously.

19. The apparatus of claim 17, wherein the processor is configured to match the received current frame and the received at least one event signal, received between a timing of a previous frame and a timing of the current frame.

20. The apparatus of claim 17, wherein the processor is configured to match the received current frame and the received at least one event signal, received between a timing to which a predetermined latency is delayed from a timing of a previous frame and a timing to which the predetermined latency is delayed from a timing of the current frame.

* * * * *